United States Patent
Otto et al.

(10) Patent No.: US 11,543,985 B2
(45) Date of Patent: Jan. 3, 2023

(54) ZONE SEGMENT DRIVE MANAGEMENT

(71) Applicant: Oracle International Corporation, Redwood Shores, CA (US)

(72) Inventors: Erich Stephen Otto, Longmont, CO (US); Michael Warren Kirby, Westminster, CO (US); Ajinkya Pramod Kulkarni, Thornton, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/229,709

(22) Filed: Apr. 13, 2021

(65) Prior Publication Data

US 2022/0326847 A1    Oct. 13, 2022

(51) Int. Cl.
*G06F 3/06* (2006.01)

(52) U.S. Cl.
CPC .......... *G06F 3/064* (2013.01); *G06F 3/0635* (2013.01); *G06F 3/0653* (2013.01); *G06F 3/0665* (2013.01); *G06F 3/0679* (2013.01); *G06F 3/0604* (2013.01)

(58) Field of Classification Search
CPC ...... G06F 3/0604; G06F 3/0635; G06F 3/064; G06F 3/0653; G06F 3/0665; G06F 3/0679
See application file for complete search history.

(56) References Cited

U.S. PATENT DOCUMENTS 9,418,699 B1 * 8/2016 Gibbons ............ G11B 20/1217
10,417,190 B1   9/2019 Donlan et al.

OTHER PUBLICATIONS

International PCT Application No. PCT/US2021/042619, "International Search Report and the Written Opinion", dated Dec. 23, 2021, 16 pages.

* cited by examiner

*Primary Examiner* — Larry T Mackall
(74) *Attorney, Agent, or Firm* — Kilpatrick Townsend & Stockton LLP

(57) ABSTRACT

Techniques for management of data storage in distributed storage systems are provided. A method may include receiving, by a computer system, a request to write data to a volume. The method may include identifying, by the computer system, a zone segment mapped to the volume. The zone segment may include a plurality of zones. The method may include identifying, by the computer system, a segment pointer indicating a write location in a zone of the zone segment. The method may include writing, by the computer system, the data to one or more zones of the plurality of zones of the zone segment, starting at the write location. The method may also include updating, by the computer system, the segment pointer according to a data endpoint of the data in the zone segment.

20 Claims, 11 Drawing Sheets

ZONE SEGMENT DRIVE MANAGEMENT

BACKGROUND

Cloud-based platforms provide scalable and flexible computing resources for users' data. Such cloud-based platforms, also referred to as infrastructure as a service (IaaS), may offer entire suites of cloud solutions around a customer's data, for example, solutions for authoring transformations, loading data, and presenting the data.

Shingled Magnetic Recording (SMR) increases storage capacity on hard disk drives by partially overlapping, or shingling, recording tracks. The overlapped tracks may be grouped into zones. By shingling tracks in such a way that a read path is preserved, the tracks may still be read even though they have been partially overwritten. In contrast, as a result of the shingling, while read operations may be still be performed randomly within the zones, write operations will need to be applied sequentially to an entire zone, rather than to a range within the zone.

BRIEF SUMMARY

Techniques are provided (e.g., a method, a system, non-transitory computer-readable medium storing code or instructions executable by one or more processors) for management of object storage of cloud resources data on shingled magnetic recording drives.

In certain embodiments, a method may include receiving, by a computer system, a request to write data to a volume. The method may include identifying, by the computer system, a zone segment mapped to the volume. The zone segment may include a plurality of zones. The method may include identifying, by the computer system, a segment pointer indicating a write location in a zone of the zone segment. The method may include writing, by the computer system, the data to one or more zones of the plurality of zones of the zone segment, starting at the write location. The method may also include updating, by the computer system, the segment pointer according to an endpoint of the data in the zone segment.

In some embodiments, the method may further include ascertaining a size of the data identified in the request. The method may include ascertaining a capacity of the zone, wherein the capacity corresponds to a write path between the write location and an endpoint of the zone. The method may include comparing the capacity of the zone to the size of the data. The method may include, in accordance with the size of the data exceeding the capacity of the zone, breaking the data into a first block and a second block. The size of the first block may correspond to the capacity of the zone. The method may include writing the first block starting at the write location. The method may also include writing the second block to a subsequent zone of the zone segment.

In some embodiments, updating the segment pointer may include, in accordance with the endpoint of the data in the zone segment coinciding with a capacity of the zone segment, marking the zone segment as a full zone segment. Updating the segment pointer may also include identifying a new zone segment mapped to the volume, and updating the segment pointer to the starting point of the new zone segment. Identifying the segment pointer may include scanning the zone segment mapped to the volume for empty or open zones.

In some embodiments, a computer system includes one or more processors and a memory in communication with the one or more processors, the memory configured to store computer-executable instructions, wherein executing the computer-executable instructions causes the one or more processors to perform one or more of the steps of the method or its variations described above. Identifying the segment pointer may further include, in accordance with the zone segment mapped to the volume not including an empty or open zone, allocating a new zone segment to the volume. The segment pointer may be the start position of a first zone of the new zone segment.

In some embodiments, the method may include ascertaining a usage fraction of the zone segment. The method may include comparing the usage fraction to a usage threshold. The method may include, in accordance with the usage fraction not satisfying the usage threshold, identifying stored data in the plurality of zones of the zone segment, mapping the stored data from one or more source zones to one or more empty or open zones of the plurality of zones, writing the stored data to the empty or open zones, and resetting the source zones to an open status. Identifying stored data in the plurality of zones may include receiving mapping metadata describing the mapping of the zone segment to the volume and locating the stored data in the plurality of zones according to the mapping metadata.

In some embodiments, the plurality of zones may be implemented in a shingled magnetic recording storage system.

In certain embodiments, a computer system includes one or more processors and a non-transitory computer-readable memory storing instructions that, when executed by the one or more processors, cause the one or more processors to perform one or more operations of the method or its variations described above.

In certain embodiments, a computer-readable storage medium stores computer-executable instructions that, when executed, cause one or more processors of a computer system to perform one or more operations of the method or its variations described above.

DETAILED DESCRIPTION

Figure 1:
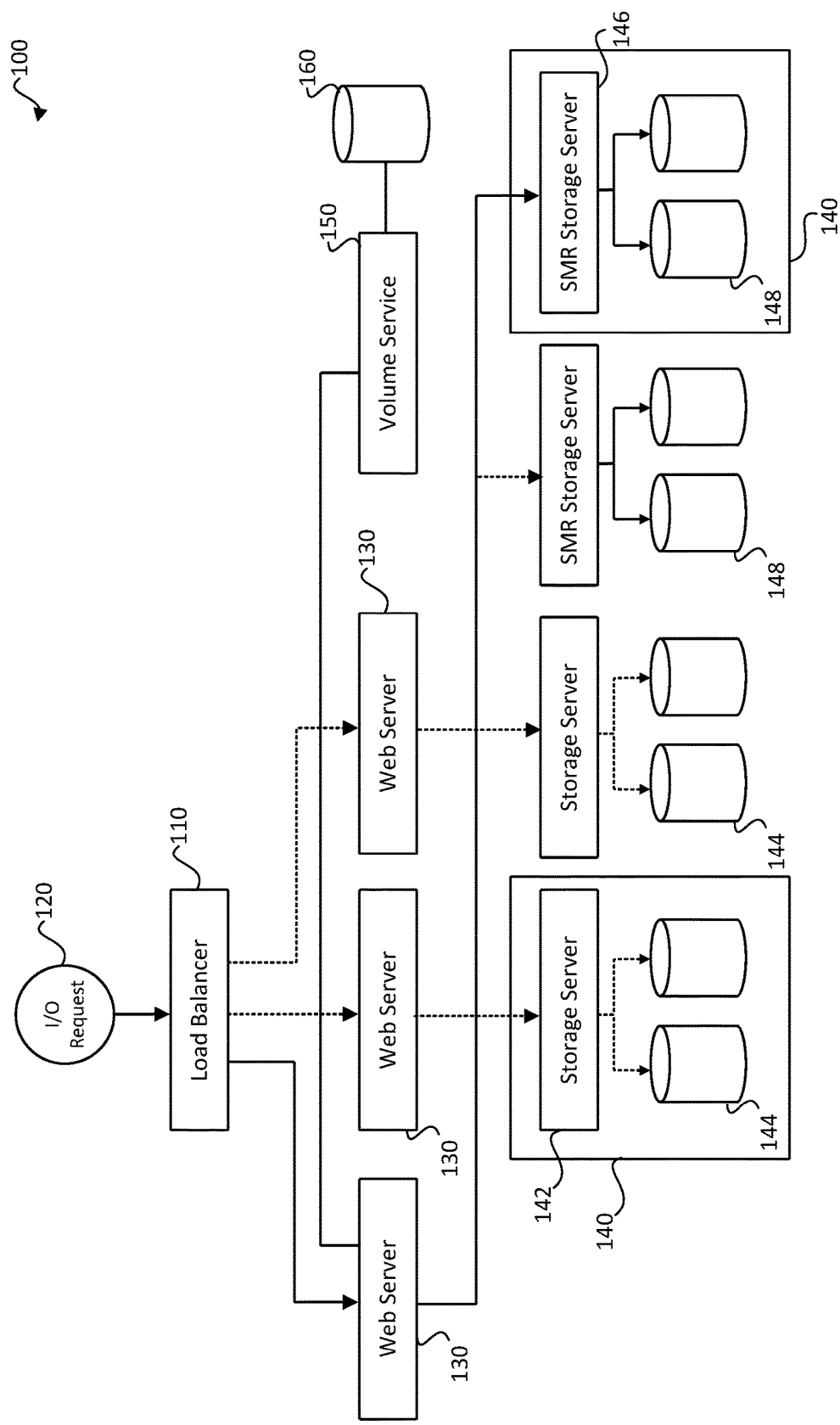
FIG. 1 illustrates an example system for managing object storage servers, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Such cloud-based platforms, also referred to as infrastructure as a service (IaaS) may offer entire suites of cloud solutions around a customer's data, for example solutions for authoring transformations, loading data, and presenting the data. In data replication and backup systems, which may be a part of a back end data storage system, Shingled Magnetic Recording (SMR) drives may increase storage capacity of the data storage system. SMR drives partially overlapping, or shingling, recording tracks, and thereby may permit more tracks to be written to a hard disk of a given size. The overlapped tracks may be grouped into zones, that may be organized into zone segments. By shingling tracks in such a way that a read path is preserved, the tracks may still be read even though they have been partially overwritten. In contrast, as a result of the shingling, a write operation may be applied in an append-only process, by which partially overwritten data may be read, but may not be overwritten. As such, access to SMR drives may be provided by a block interface, rather than a file system, as described below, due to the additional operations involved in writing to SMR drives.

In distributed storage systems, user data may be stored in volume storage (e.g., block volume storage) and in object storage. Users may interact directly with volume storage systems, while a back-end storage subsystem of the database system may use object storage, for example, for data replication, backup, or other data storage (e.g., to supplement database system capacity). Implementation of SMR drives in data replication or backup systems is limited by the relative complexity of writing and rewriting data to SMR drives. As described in more detail in reference to FIG. 2, organizing partially overwritten tracks in zones may cause inefficiency when a system attempts to write to a zone data that exceeds the available capacity in the zone. For example, in conventional SMR drives, a system may reject a request to write to a zone data exceeding the capacity of the zone. To address this limitation, zones may be organized into zone segments, and a system managing data storage may address write requests to the zone segment rather than to an individual zone. In this way, a write position in a zone segment may be identified, and data referenced by a write request may be written across multiple zones in a zone segment.

In some examples, block storage is often used where fast, efficient, and reliable data transportation is desired. Block storage breaks up data into blocks, and can store those blocks as separate pieces (e.g., each block with its own identifier). The blocks can then be stored across different systems and each block can be configured (e.g., partitioned) to work with different systems. Alternatively, object storage breaks data file into pieces (e.g., objects), and then stores them in a single repository, which can be spread across multiple networked systems. In the context of block storage, a volume (e.g., a block volume) can be a detachable (e.g., physically or virtually) block storage device that allows a developer to dynamically expand the storage capacity of an instance. To increase or decrease the size of block volume storage, block volumes can be spun up or down, respectively, without much effort. Where the database system implements both volume storage and object storage, I/O requests may make reference to data by a volume identifier (e.g., a block volume identifier). The volume identifier may be mapped to storage locations in the object storage systems, through volume metadata stored in a metadata database included as part of the database system. In the case of a write request, the database system may identify a zone segment in an SMR system storing data mapped to a volume referenced in the write request. Once identified, the database system may identify a zone segment pointer that describes a write position in a zone included in the zone segment at which new data may be written. Rather than overwriting the zone, the SMR system may write to the zone, may break the data into blocks to be written across multiple zones, may decline the request if a zone is not available having the capacity to store the data, or may allocate new zone segment(s) to store the overrun data. In this way, the SMR system may write data to hard disk drives in such a way that the effective capacity of the object storage system is increased through the use of SMR storage, while limiting the impact of zone write failures caused by data size exceeding zone capacity. In a similar way, reading, deleting, and defragmenting techniques may also be implemented using the SMR system, in reference to volume metadata mapped to data stored in zone segments.

In an illustrative example, a database system may be configured to store cloud resource data as part of a distributed storage system. The database system may include an SMR system. The SMR system may include an SMR storage server in communication with one or more SMR database systems, which may be or include hard disk drives configured for SMR storage using zones organized in zone segments. In this example, the system may receive input/output (I/O) requests, such as write requests (also referred to as "put" requests), read requests (also referred to as "get" requests), as well as other I/O processes including, but not limited to, delete requests or defragmentation operations. As part of SMR configuration, I/O requests may cause the database system to implemented improved processes to identify and manage data stored in the SMR system in zone segments.

The process of implementing I/O processes with the back-end storage subsystem improves the overall performance of data replication, storage, and backup systems, at least because it permits efficient I/O from SMR configured storage systems. For example, SMR systems may provide an increased storage capacity of as much as 25%, or more, without addition of hard disk drives to the system, by at least partially shingling previously written magnetic tracks. Organizing SMR zones into zone segments may improve I/O processes by permitting improved speed, efficiency, and success rate of serving I/O requests made on SMR drives. Furthermore, by managing zone drives as described in reference to the forthcoming figures, the database system may reduce system complexity by permitting the database system to use host-managed drives, controlled by an integrated block interface making reference to volume metadata to map object data to volume data.

FIG. 1 illustrates an example system 100 for managing object storage servers, in accordance with one or more embodiments. The database system 100 may be configured to distribute and store user data across multiple storage systems, which may implement various magnetic recording technologies (e.g., perpendicular magnetic recording (PMR), SMR, or the like), as part of a back end data storage subsystem. In this way, the database system 100 may serve I/O requests on data stored in object storage as part of data replication, restoring volume data to block volume systems, or defragmenting SMR systems that organize zones into zone segments as an approach to facilitating improved I/O operations in a distributed data storage system.

In some embodiments, the system 100 may include a load balancer 110, which may be configured to receive an I/O request 120 and to send the I/O request 120 to a web server 130. The load balancer 110 may distribute I/O requests across multiple web servers 130 as part of a distributed storage system, which may be located in multiple different physical locations and/or may include multiple web servers 130 in a single physical location. Similarly, the web server 130 may be in communication with one or more storage systems 140. The storage systems 140 may be configured to store data in PMR or SMR configurations. For example, a storage system 140 may include a storage server 142 in communication with one or more PMR drives 144. Additionally, the web server 130 may be in communication with a storage system including an SMR storage server 146 that is in communication with one or more SMR drives 148, as described in more detail in reference to FIG. 2. The system 100 may be configured, for example, through execution of software by the SMR storage server 146, to execute the I/O request 120 on data stored in the SMR drives 148.

The system 100 may map data stored in the storage systems 140 to volume data by making reference to a volume service 150. In this way, the I/O request 120 may include a reference to a volume identifier, which may be mapped to a location in the storage of the storage system 140, in a volume metadata database 160. In an example, a read request may reference a volume identifier, which may be mapped to a zone segment, a segment pointer, and a read size, in an entry in the volume metadata database 160.

In this way, the system 100 may manage SMR drives 148 as part of a distributed data storage system. Advantageously, the system 100 may permit a back end data storage subsystem to benefit from the increased storage capacity of the SMR drives 148, while maintaining integration with a front end block volume system. As described in more detail in reference to FIGS. 3-6, the database system 100 may receive I/O requests 120, for example, as part of data replication or backup, and may implement the I/O requests 120 by reading, writing, or defragmenting PMR drives 144 and/or SMR drives 148.

Figure 2:
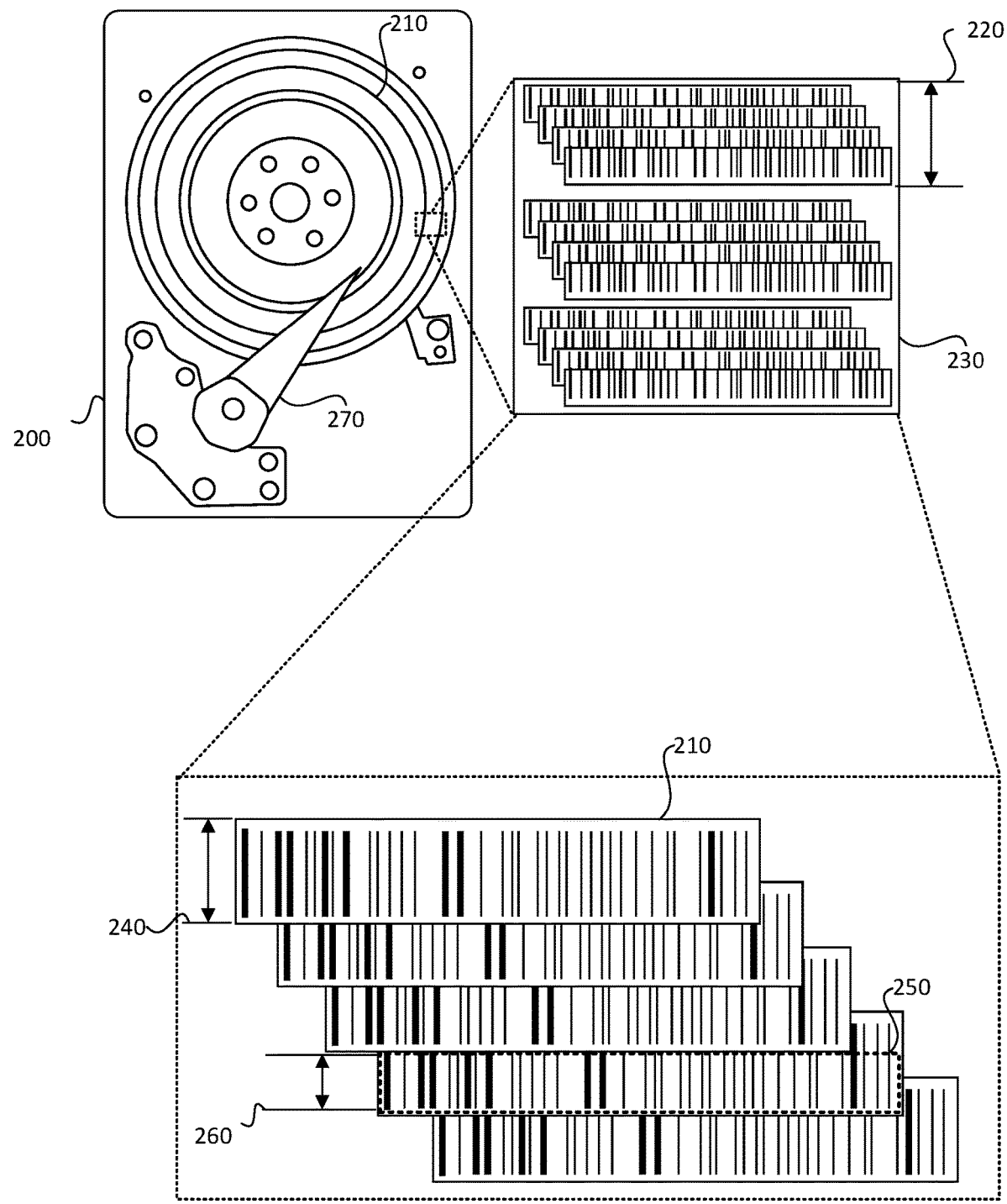
FIG. 2 illustrates an example shingled magnetic recording drive, in accordance with one or more embodiments.

FIG. 2 illustrates an example shingled magnetic recording SMR drive 200, in accordance with one or more embodiments. The physical processes and data structures of the SMR drive 200 are based on overwriting magnetic tracks 210 on disks of the SMR drive 200. In a PMR drive, magnetic tracks are not overwritten. As such, data stored in the PMR drive may be accessed randomly (e.g., a PMR drive may be used as random-access hard drive storage). By contrast, SMR drives, being able to write by appending data rather than random-access, are typically configured for reading data efficiently that are unlikely to be modified.

Data in the SMR drive 200 may be stored using a block system, rather than a file system, as part of the append-only I/O system. As such, data blocks may be written to zones 220 of a fixed size (e.g., 256 MB), which may be organized into zone segments 230. Physically, each zone may be described by a number of magnetic tracks 210 having a fixed write width 240, that are partially overwritten to provide a data track 250. The data track may be described by a data track pitch 260, which may be a parameter of the SMR drive 200 that depends, for example, on specifications of a read/write head 270 of the SMR drive 200. With a narrower data track pitch 260, the overall capacity of the SMR drive 200 increases, limited by factors including the ability of the read/write head 270 to accurately read the data track 250.

The magnetic tracks 210 are illustrated having a fixed width in order to demonstrate the hierarchical organization of the zones 220 and the zone segments 230. Rather than indexing data to a single position in a discrete track, as is done in PMR drives, the SMR drive 200 may organize data in the zones 220 extending across multiple magnetic tracks 210, indexed by pointers indicating the starting point of the zone segment 230, the starting point of the zone 220, and/or a location within the zone 220 where the data is to be found. For example, a pointer may include a write pointer, describing the last-written position in the zone 220, where subsequent write operations will append new data.

In some cases, the zone 220 may be described by one or more statuses that may govern whether data may be written to the zone 220. For example, the statuses of the zone 220 may include, but are not limited to, "empty," "full," "open," "closed," or "finished." An empty status may indicate that the zone 220 is able to be written from the beginning of the magnetic tracks 210 of the zone 220 (e.g., the write pointer for the zone 220 is at the start of the zone 220). Similarly, a full status may indicate that the zone 220 is not available for additional write operations (e.g., the write pointer for the zone 220 is at the end or near the end of the zone 220). The open status may indicate that the zone 220 is available for write operations (e.g., the zone 220 has capacity available for writing data to the magnetic tracks 210 of the zone 220 and the SMR drive 220 has resources assigned to implement write operations). Closed status, by contrast, may indicate that the zone 220 is not available for write operations, but may be opened. Finished status may indicate that data will not be written to the zone 220 (e.g., the write pointer for the zone 220 may be moved to the end of the zone to prevent further write operations). A finished zone may be opened by setting the zone 220 to an empty status (e.g., by moving the write pointer to the start of the zone 220).

Organizing the zones 220 into the zone segment 230 may permit the zones 220 to be managed together in such a way that a segment pointer may be defined, describing a write position for the zone segment 230, rather than a write position for each zone. Within the zones 220 of the zone segment 230, zone-specific write positions may follow the statuses described above, while the segment pointer may describe a write position in the first available open zone of the zone segment 230. For example, the zones 220 may be organized in the zone segment 230 sequentially. In this way, data may be written in blocks across multiple zones 220 in the zone segment 230. Organizing zones in a sequential manner may permit the SMR drive 200 to better accommodate write requests referencing data the length of which exceeds the capacity of the open zone. The SMR drive 200 may open multiple zones in a zone segment, and may define multiple write operations based on a single write request. As described in more detail in reference to FIG. 3, below, write operations may be implemented by identifying a segment pointer indicating a location to start writing data in a zone 220 of the zone segment 230.

Figure 3:
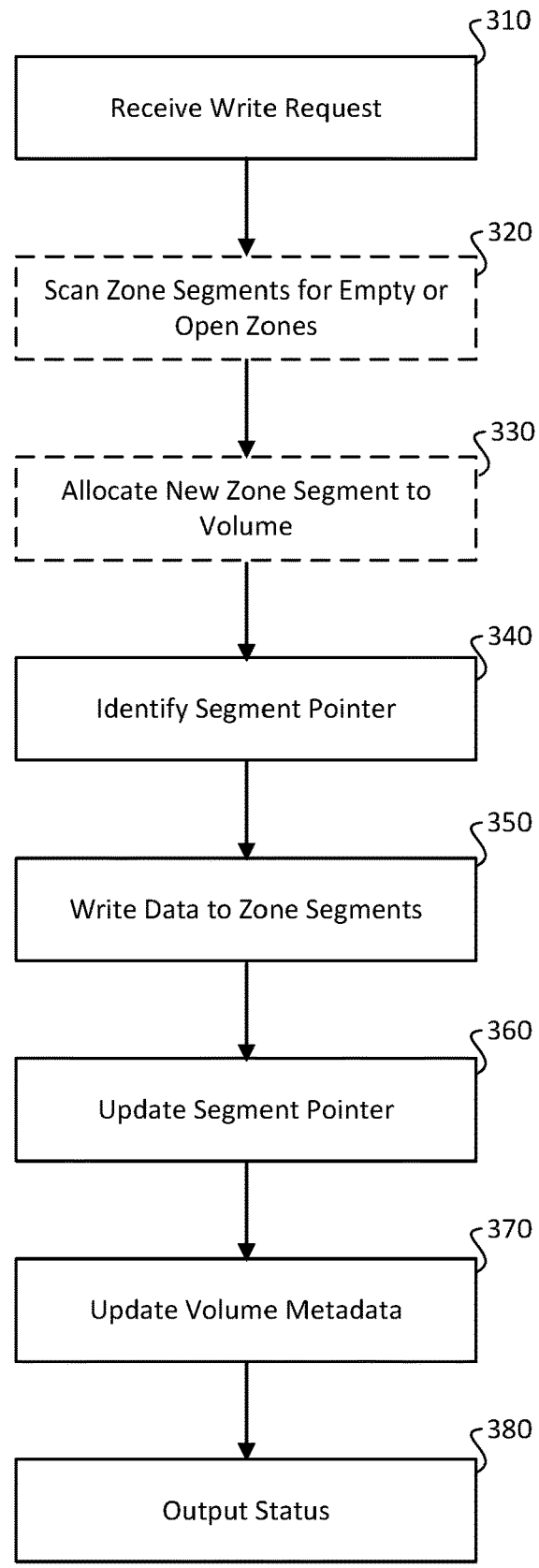
FIG. 3 illustrates an example flow for writing object data to a zone segment, in accordance with one or more embodiments.

FIG. 3 illustrates an example flow 300 for writing object data to a zone segment, in accordance with one or more embodiments. The operations of the flow can be implemented as hardware circuitry and/or stored as computer-readable instructions on a non-transitory computer-readable medium of a computer system, such as the system 100 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 300 includes an operation 310, where the computer system receives a write request. The write request (e.g., I/O request 120 of FIG. 1) may be received from distributed data storage system managing data replication, archive, or other storage, based, for example, on a user request to store data in object storage, rather than in a block volume system. As part of receiving the write request, the computer system may forward the request to other networked systems (e.g., as part of an IaaS infrastructure system), as described in more detail in reference to FIG. 1. For example, the write request may be forwarded to a web server (e.g., web server 130 of FIG. 1), which may select a storage server (e.g., SMR storage server 146 of FIG. 1) to handle the write request.

In an example, the flow 300 optionally includes an operation 320, where the computer system scans the zone segment for empty or open zones. The write request may include a data chunk of a defined length, where the chunk is a block of data to be written to the zone segment (e.g., zone segment 230 of FIG. 2). As described in more detail in reference to FIG. 2, the zone segment may include multiple zones (e.g., zone 220 of FIG. 2) providing a storage capacity equivalent to the integer multiple of the capacity of the zones. One or more zones in the zone segment may be empty or open, and may therefore be available for write operations. The zones may be organized in the zone segment in sequence, such that an open zone may be followed by an empty zone. It should be understood that an empty zone does not necessarily indicate a zone for which the magnetic tracks are blank, but rather may indicate a zone for which the write position for the zone is at the start of the zone.

In an example, the flow 300 optionally includes an operation 330, where the computer system allocates a new zone segment to the volume. In some cases, the scan of the zone segment may not identify an empty or open zone before the terminal zone of the zone segment. In some embodiments, the system may allocate a new zone segment to the volume referenced in the write request (e.g., by a volume identifier) to increase the capacity available to write data for the referenced volume. The new zone segment may be allocated from a free pool of zone segments maintained for the purpose of reducing the proportion of write requests that are rejected for lack of capacity. In some embodiments, the new zone segment may be allocated from the same SMR drive storing the zone segment, or may be allocated from a different SMR drive, coordinated through an SMR storage server (e.g., SMR storage server 146 of FIG. 1).

In an example, the flow 300 includes an operation 340, where the computer system identifies a segment pointer. Within the zone segment (or the new zone segment) the system may identify the segment pointer by locating the first zone of the zone segment described by an open or empty status. For example, where the zones are organized sequentially in the zone segment, the segment pointer may correspond to the write position of the first open zone. In another example, the segment pointer may correspond to the start position of the first empty zone, where the zone segment does not include an open zone.

In an example, the flow 300 includes an operation 350, where the computer system writes data to a zone of the zone segments according to the segment pointer. Starting from the segment pointer, the system may write data referenced by the write request to the zone corresponding to the segment pointer. The write operation may include an initial check by the system whether the zone corresponding to the segment pointer has capacity for the entire chunk referenced by the write request. In cases where the zone has insufficient capacity, the system may define multiple blocks, such that the chunk may be split across multiple zones of the zone segment. In an illustrative example, the zones of the zone segment may be organized sequentially, and a chunk may be split into a first block and a second block in such a way that the size of the first block corresponds to the write capacity of the zone corresponding to the segment pointer. The first block may be written starting at the segment pointer and the second block may be written to the next zone. While this example describes zones in sequence, method 300 may be implemented with other approaches.

In an example, the flow 300 includes an operation 360, where the computer system updates the segment pointer. Following completion of the write operation, which may include multiple write operations where the data is written to multiple zones, the system may define the segment pointer to the end position of the data. In this way, the updated segment pointer may correspond to a write position in a different zone of the zone segment, relative to the zone corresponding to the segment pointer preceding the receipt of the write request.

In an example, the flow 300 includes an operation 370, where the computer system updates the volume metadata. As described in more detail in reference to FIG. 1, the data written to the zone segment may be mapped to a block volume through volume metadata. The volume metadata may include the segment pointer, and, as such, updating the volume metadata may include updating the segment pointer in a volume metadata database (e.g., volume metadata database 160 of FIG. 1), as well as updating the volume-zone segment mapping in cases where new zone segments have been allocated, as part of operations 320 and 330. In some examples, the volume metadata may store the start location pointer from which the data was written which corresponds to the segment pointer value before it was updated in operation 360.

In an example, the flow 300 includes an operation 380, where the computer system outputs a status of the write request. In some embodiments, the system may be configured to output various different types of status reports. For example, resource metadata, such as usage and capacity data may be collected and managed as part of improving IaaS system operations. As another example, the success or failure of the write request may be returned to the system, such that the system may repeat some or all of the operations of the method 300. As another example, the system may output a status to a user of an IaaS console interface, where the write request originated with a human user.

Zone segment organization may provide a significant technical improvement for the operation of a database system that incorporates SMR drives. By implementing the techniques of writing to a zone segment, including multiple zones, data may be written across zones, and capacity of multiple zones may be shared. In this way, data replication, storage, and backup operations, facilitated by volume-metadata mapped to zone segment pointers, may improve the efficiency of SMR write and re/write operations.

Figure 4:
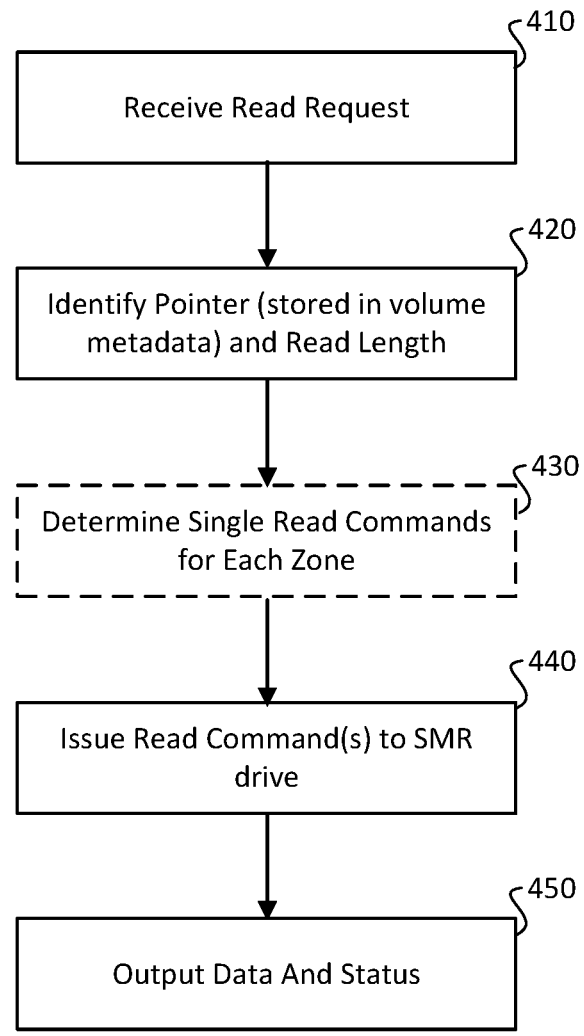
FIG. 4 illustrates an example flow for reading data from a zone segment, in accordance with one or more embodiments.

FIG. 4 illustrates an example flow 400 for reading data from a zone segment, in accordance with one or more embodiments. The operations of the flow can be implemented as hardware circuitry and/or stored as computer-readable instructions on a non-transitory computer-readable medium of a computer system, such as the system 100 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 400 includes an operation 410, where the computer system receives a read request. As described in more detail in reference to FIG. 1, a read request may reference a volume and a data block to be read. The volume may be referenced by a volume identifier and a block identifier, which may be mapped in volume metadata to an SMR drive. SMR drives may define zone segments including zones, which may be organized sequentially in the zone segments. In this way, the system may receive the read request as part of a data access operation, for example, as part of a data restore process, and may be configured to access multiple zones of a zone segment to read the data.

In an example, the flow 400 includes an operation 420, where the computer system identifies a stored pointer that was stored in the volume metadata (e.g., when the volume metadata is updated at 370 of FIG. 3) and a read length. The stored pointer and the read length may correspond to a volume identified in the read request. The volume identifier may be mapped to a zone segment, and to a zone of the zone segment, by the stored pointer. In contrast to the method described in reference to FIG. 3, the stored pointer of the flow 400 may reference a read position, rather than a write position. Even so, it similarly may be understood to reference to a start position in the zone segment for the SMR drive to read data.

The read request may also include reference to data to be read, which may be mapped to a read length on the SMR drive. The read length may correspond to a dimension or length of track (e.g., data track 250 of FIG. 2) to be read, such that the system may determine whether the read length overlaps multiple zones in a zone segment. For example, where zones are organized sequentially in a zone segment, the system may indicate a first read position at the segment pointer and a second read position at the start position of the next zone in the zone segment.

In an example, the flow 400 optionally includes an operation 430, where the computer system determines single read commands for each zone in the zone segment. Where the read length, starting from the segment pointer identified in operation 420, extends over multiple zones, the system may determine multiple read commands for different zones of the zone segment. The multiple single read commands may be cross-referenced, such that the data returned by the read command may be reconstructed according to the read length determined in operation 420. In this way, data written across multiple zones may be read by a single read request referencing a zone segment, rather than multiple read requests addressed at individual zones.

In an example, the flow 400 includes an operation 440, where the computer system issues a read command to the SMR drive. As described in more detail in reference to FIG. 1, the system may manage data storage via storage servers (e.g., storage server 142 or SMR server 146 of FIG. 1). The read command may include the segment pointer and read length determined in operation 420, and the system may issue the read command to an SMR storage server referenced by mapping metadata, such as the volume metadata as described in more detail in reference to FIG. 1.

In an example, the flow 400 includes an operation 450, where the computer system outputs read data and a status of the read request. Output of the data may include communicating the data from the SMR drive to a destination referenced in the read request. For example, the system may output the data to a volume storage system, or as part of data replication operations from one object storage drive to another object storage drive. Similarly to the flow 300, the status may include success/failure information for the request, as well as other information including, but not limited to, metadata describing the data and zones referenced in the read command.

Facilitating read commands using the operations of the flow 400 may provide a significant technical improvement for the operation of a database system that incorporates SMR drives. By implementing the techniques of serving read requests addressed at multiple zones organized into zone segments, data may be more efficiently read from SMR drives without multiple read requests generated for each zone in the zone segment.

Figure 5:
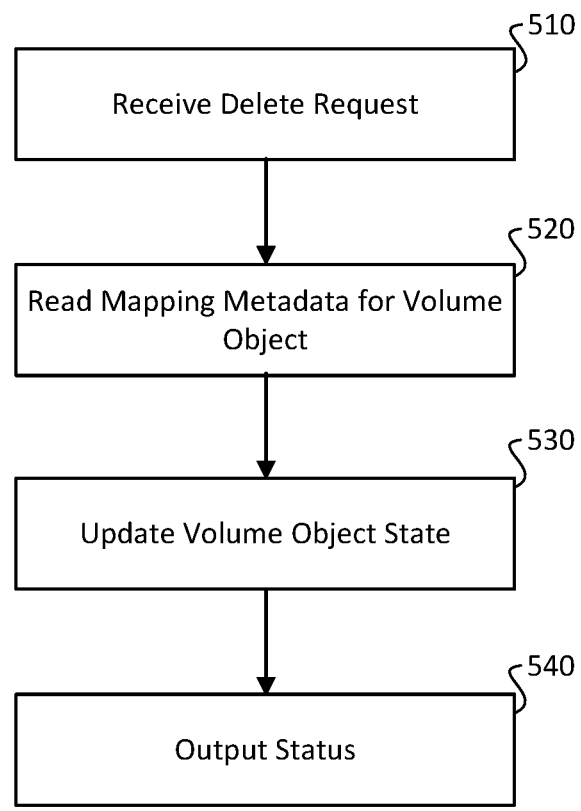
FIG. 5 illustrates an example flow for deleting data from a zone segment, in accordance with one or more embodiments.

FIG. 5 illustrates an example flow 500 for deleting data from a zone segment, in accordance with one or more embodiments. The operations of the flow can be implemented as hardware circuitry and/or stored as computer-readable instructions on a non-transitory computer-readable medium of a computer system, such as the system 100 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 500 includes an operation 510, where the computer system receives a delete request. In contrast to read or write operations, delete operations may proceed without reference to a segment pointer as a start position. Instead, the delete request may include volume identifier information, which may be mapped to object storage in one or more drives, such as SMR drives as described in more detail in reference to FIG. 2 (e.g., SMR drive 200 of FIG. 2).

In an example, the flow 500 includes an operation 520, where the computer system reads mapping metadata for the volume object. As described in more detail in reference to FIG. 1, mapping metadata may reference the zone segment storing data for the block volume subject to the delete request. In this way, the system may identify the zone segment or zone segments allocated to the volume identified in the delete request by making reference to the mapping metadata.

In an example, the flow 500 includes an operation 530, where the computer system updates a state of the volume object. Updating the state of the volume object may include, but is not limited to, sending an instruction to a storage server (e.g., SMR storage server 146 of FIG. 1) to modify the status of the zones included in an allocated zone segment from "full" or "open" to "empty," such that for subsequent write requests, the segment pointer corresponds to a start position of the first zone in the zone segment. Additionally or alternatively, the system may modify volume metadata in a volume metadata database (e.g., volume metadata database 160 of FIG. 1) to remove mapping information, such that a volume identifier included in subsequent I/O requests (e.g., I/O request 120 of FIG. 1) is not associated with zone segments in an SMR drive. For example, in the operations of the flow 300 described in reference to FIG. 3, identifying the segment pointer may return that no zone segments are allocated to the referenced volume identifier. In this way, delete requests may be addressed to a portion of a zone of a zone segment. Rather than erasing an entire zone, which may permit the SMR drive to operate in a manner more similar to a random-access drive, rather than an append-only drive, except that write requests may not write to partially overwritten tracks.

In an example, the flow 500 includes an operation 540, where the computer system outputs a status of the delete request. As with the preceding flows of FIGS. 3-4, the system may return a status of the delete request to indicate that the resources addressed by the delete request have been released, for example, to a central metadata management system. Additionally or alternatively, the system may return a status success/failure message to the originator of the delete request, to indicate whether the request should be resent or will be re-attempted.

Figure 6:
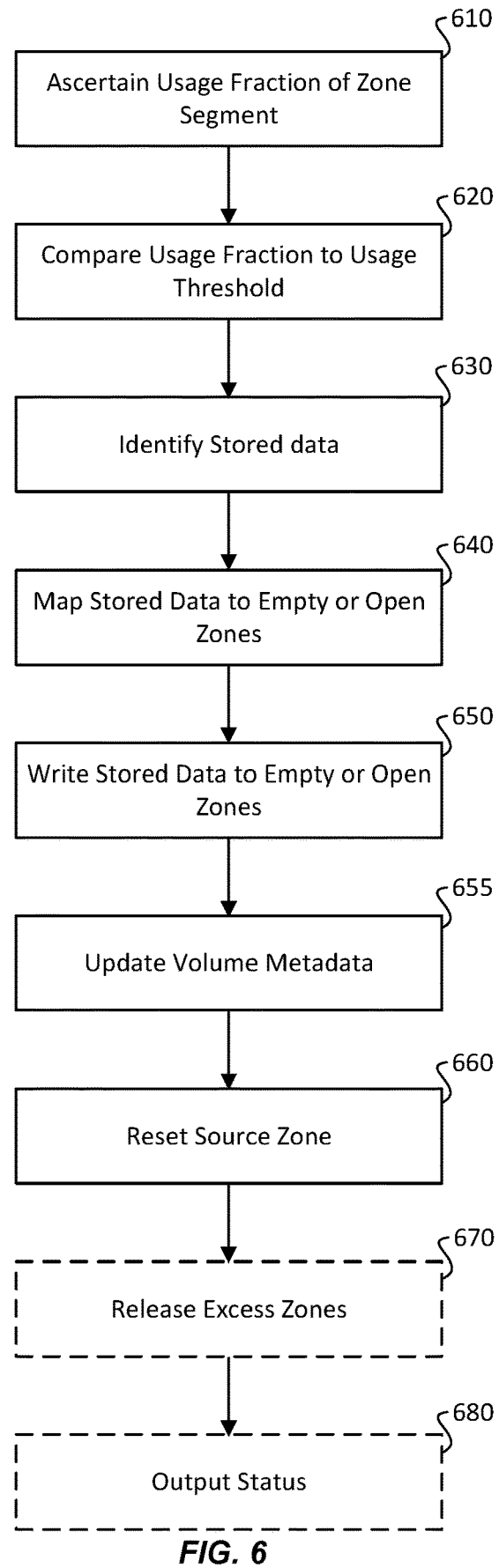
FIG. 6 illustrates an example flow for defragmenting a zone segment, in accordance with one or more embodiments.

FIG. 6 illustrates an example flow 600 for defragmenting a zone segment, in accordance with one or more embodiments. The operations of the flow can be implemented as hardware circuitry and/or stored as computer-readable instructions on a non-transitory computer-readable medium of a computer system, such as the system 100 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In addition to improving read/write operations on SMR drives, in some embodiments, defragmentation operations may also be improved through organizing zones of an SMR drive into zone segments, and remapping data stored in zones to reduce inefficient use of storage. Advantageously, defragmenting zone segments may permit SMR drives to function more like random-access drives, rather than strictly as append-only drives, but will still be limited to append-only write operations. In an illustrative example, delete requests, as described in more detail in reference to FIG. 5, may modify mapping metadata rather than data written to drives directly. Over the course of operation, an SMR drive (e.g., SMR drive 200 of FIG. 2) may use a fraction of the capacity of the zone segment, as when data has been deleted that begins in one zone and ends in a subsequent zone of the zone segment. As data in partially overlapped tracks cannot be rewritten in SMR drives, the unused capacity remaining may be unusable for write operations, which may introduce inefficiency and under-utilization of storage capacity on the SMR drive. Defragmenting the SMR drive may permit the system to release unused storage capacity, by rewriting data into new zones and remapping volume metadata.

In an example, the flow 600 includes an operation 610, where the computer system ascertains a usage fraction of a zone segment. As part of defragmentation, the system may implement automatic (e.g., without human intervention) processes based on a usage fraction exceeding a threshold to trigger the defragment operations (e.g., periodic checking of the usage fraction, refreshing the usage fraction subsequent to a delete request, or the like). To that end, the system may access the volume metadata, to ascertain the usage fraction. The usage fraction may describe the portion of storage capacity in the zones of the zone segment that are mapped in volume metadata. For example, volume metadata may reference starting points, ending points, chunk lengths, or the like, for data stored in the zone segment, amounting to only a portion of the total capacity of the zone segment, based, for example, on a zone segment having a fixed capacity.

In an example, the flow 600 includes an operation 620, where the computer system compares the usage fraction to a usage threshold. The usage threshold may be expressed in terms of a usage fraction. For example, where the system is configured to implement defragmentation when the usage fraction drops below 50%, the usage threshold may be expressed as 0.5.

In an example, the flow 600 includes an operation 630, where the computer system identifies data stored in the zones of the zone segment. When the defragmentation process has been triggered as a result of the comparison of operation 620, the system may identify, using volume metadata and/or by scanning the zone segment, the data that is to be moved during defragmentation of the zone segment. While defragmentation of a random-access drive may permit moving some data while leaving other data in place on the drive, append-only writing of SMR drives may include identifying and remapping data to new zones, and erasing the zones form which the data is copied.

In an example, the flow 600 includes an operation 640, where the computer system maps stored data to empty or open zones. In some instances, this is a two-part operation, where the first part occurs here at operation 640 (e.g., this is similar to how the write destination location is determined at operation 340 of FIG. 3) and the second part happens after operation 650 (described later). Mapping data that was identified in operation 630 may include modifying volume metadata, such that the data associated with a volume is mapped to new zones of the zone segment, to newly allocated zones, or to buffer storage, which may be in a zone segment maintained free for the use of defragmentation on the SMR drive. Similarly, random access memory may be used for the buffer memory. Remapping may include determining a configuration of the stored data that for subsequent writing of the stored data to a zone segment.

In an example, the flow 600 includes an operation 650, where the computer system writes stored data to the empty or open zones. Writing the stored data may include the operations of the flow 300, as described in more detail in reference to FIG. 3. For example, the system may send a write command to an SMR storage server (e.g., SMR storage server 146 of FIG. 1), to cause the stored data to be written to one or more empty of open zones. Where the write operation is performed on zones that are not reserved for defragmentation, the data may be left in where written, and the mapping may be maintained as provided by operation 640.

In an example, the second part of the two-part operation noted above at operation 640 occurs at operation 655 of flow 600, after the data is copied at operation 650. For example, once the data is safe in the new location, the volume metadata is updated (e.g., similar to operation 370 of FIG. 3).

In an example, the flow 600 includes an operation 660, where the computer system resets the source zone of the stored data. In addition, the system may reset the source zones of the zone segment for subsequent I/O operations (e.g., I/O operations 120 of FIG. 1). Resetting the source zones may include updating the status of the zone from "full" to "empty" or other modifications to reflect the new configuration of data in the zone segment.

In an example, the flow 600 optionally includes an operation 670, where the computer system releases excess zones. As described for operation 330 of the flow 300 in reference to FIG. 3, write operations for which the data to be written exceeds the capacity of the referenced zone segment may include allocating a new zone segment to provide additional storage capacity. In this way, defragmentation may make it such that the data may be stored in a single zone segment, by reducing the unused portion of data capacity in the zone segment. As such, zone segments may be released that were previously used to store data for the zone segment. In some embodiments, excess zones may be identified as part of mapping operations of 640, and released following writing the stored data according to the new mapping as described in reference to operation 650.

In an example, the flow 600 optionally includes an operation 680, where the computer system outputs the status of the defragment process. As with the output operations of the preceding FIGS. 3-5, operation 680 may include reporting resource usage status to a central database of resource metadata, and/or indicating a success/failure of the defragmentation process. In some embodiments, operation 680 may also include ascertaining a new usage fraction of the zone or resetting a timer or other trigger condition.

Defragmenting on a zone-segment basis may provide a significant technical improvement for the operation of a database system that incorporates SMR drives. By implementing the techniques of zone-segment defragmentation, efficient usage of SMR drive capacity may be improved, at least by improving the usage fraction of zone segments, where data may be written across zones of the zone segment. In this way, limitations introduced by append-only write operations, which are characteristic of SMR drives, may be reduced.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
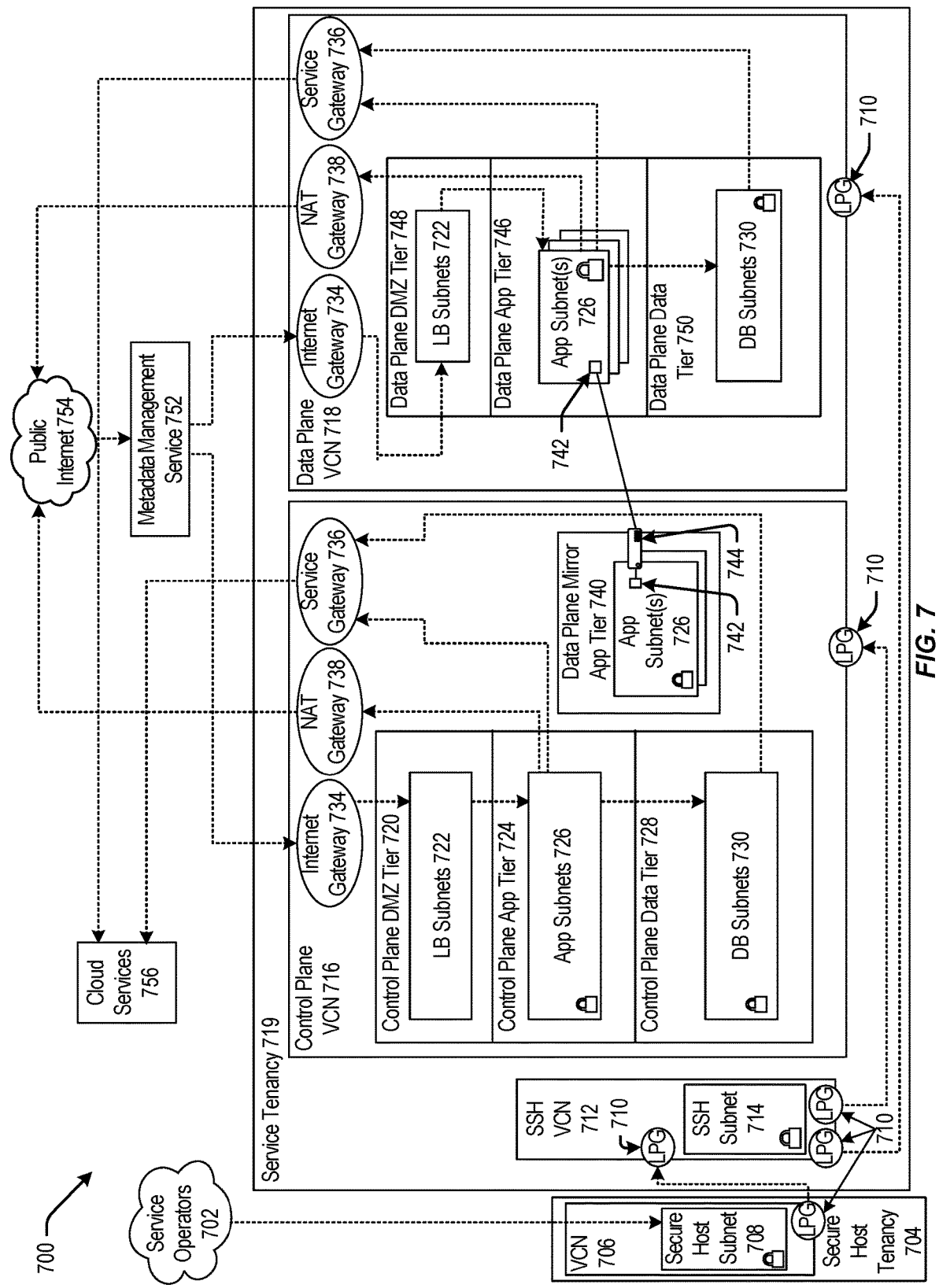
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 7, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers' resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
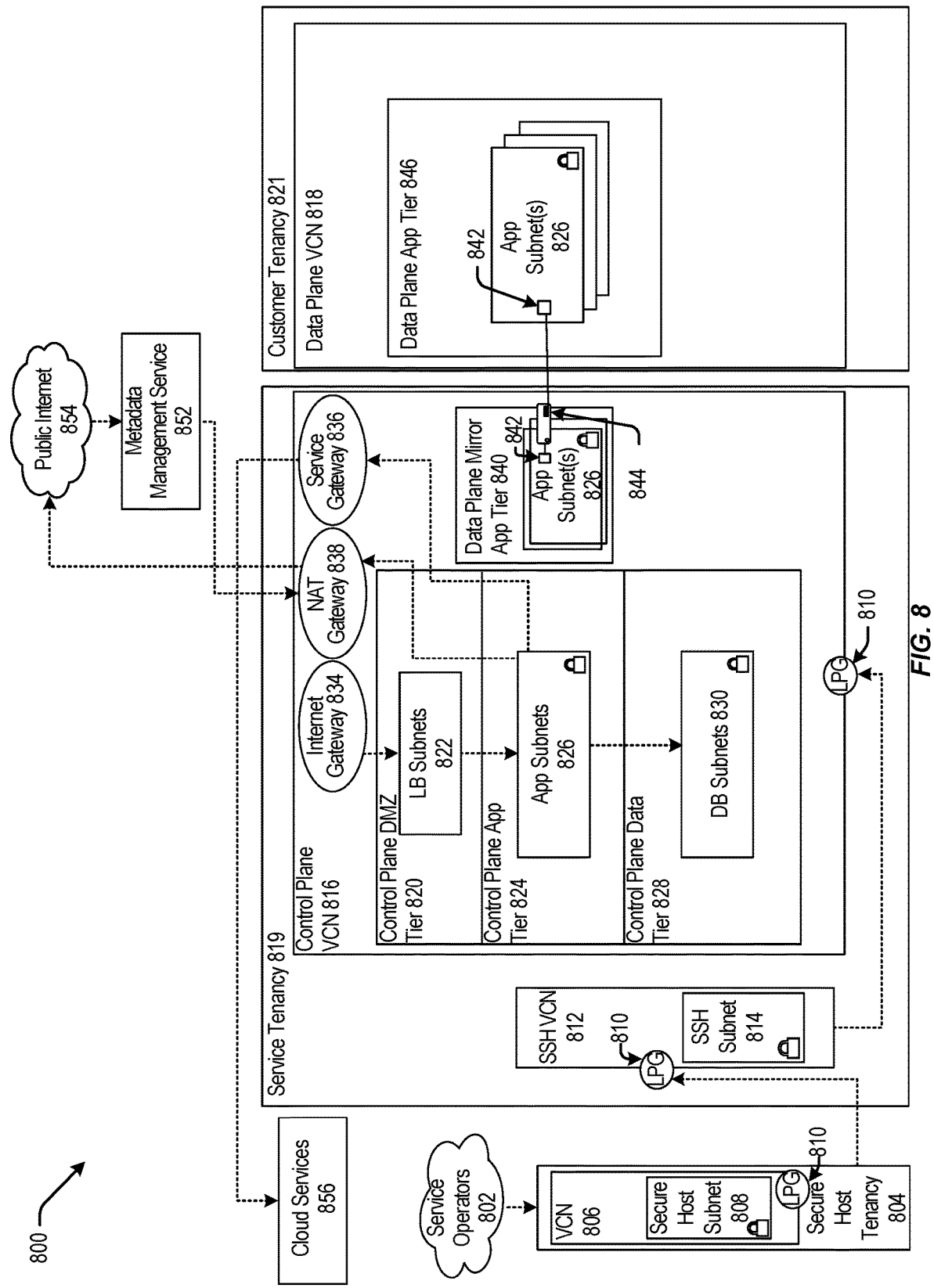
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 6," may be located in Region 1 and in "Region 2." If a call to Deployment 6 is made by the service gateway 836 contained in the control plane VCN 816 located in Region 1, the call may be transmitted to Deployment 6 in Region 1. In this example, the control plane VCN 816, or Deployment 6 in Region 1, may not be communicatively coupled to, or otherwise in communication with, Deployment 6 in Region 2.

Figure 9:
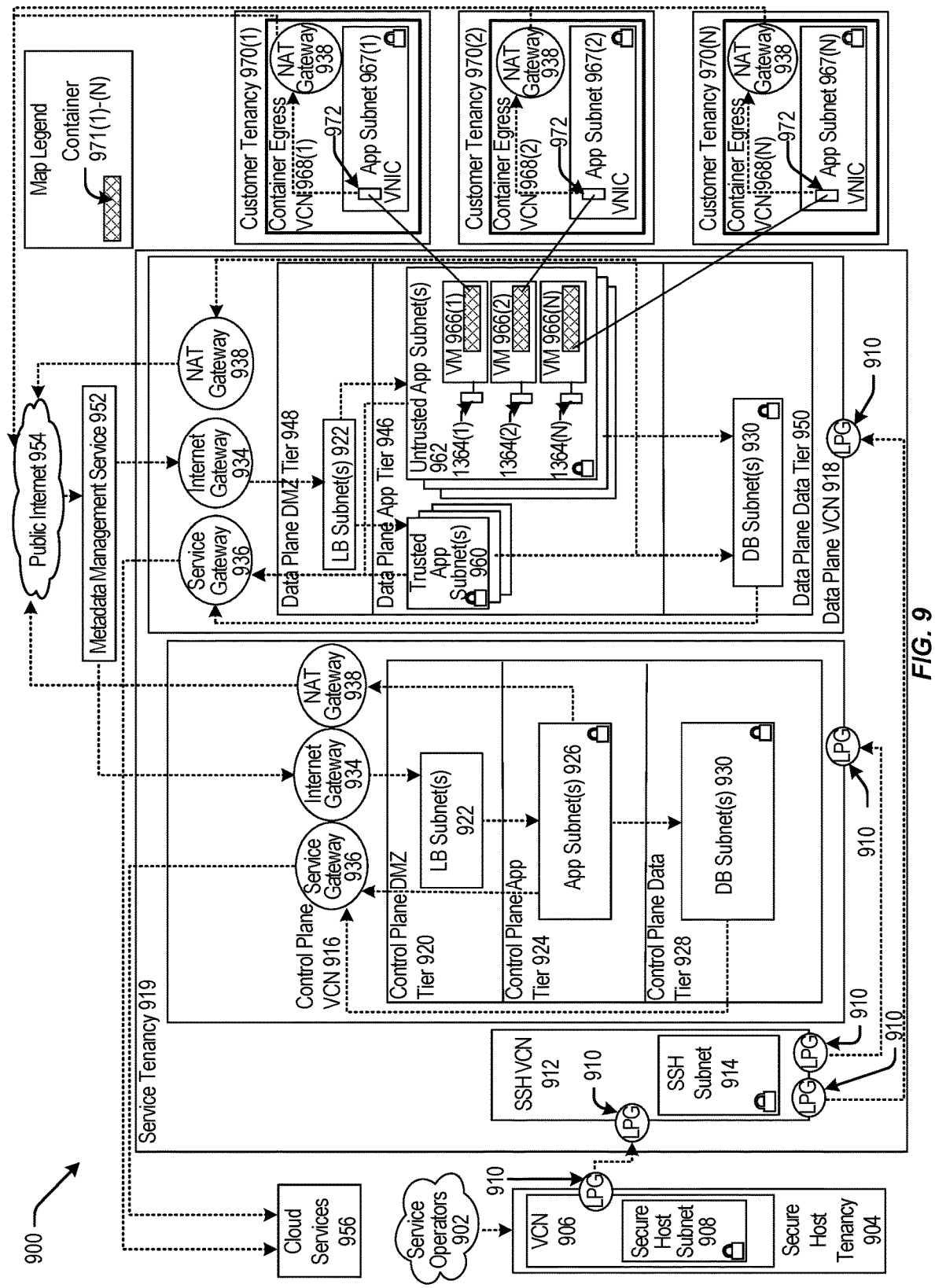
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
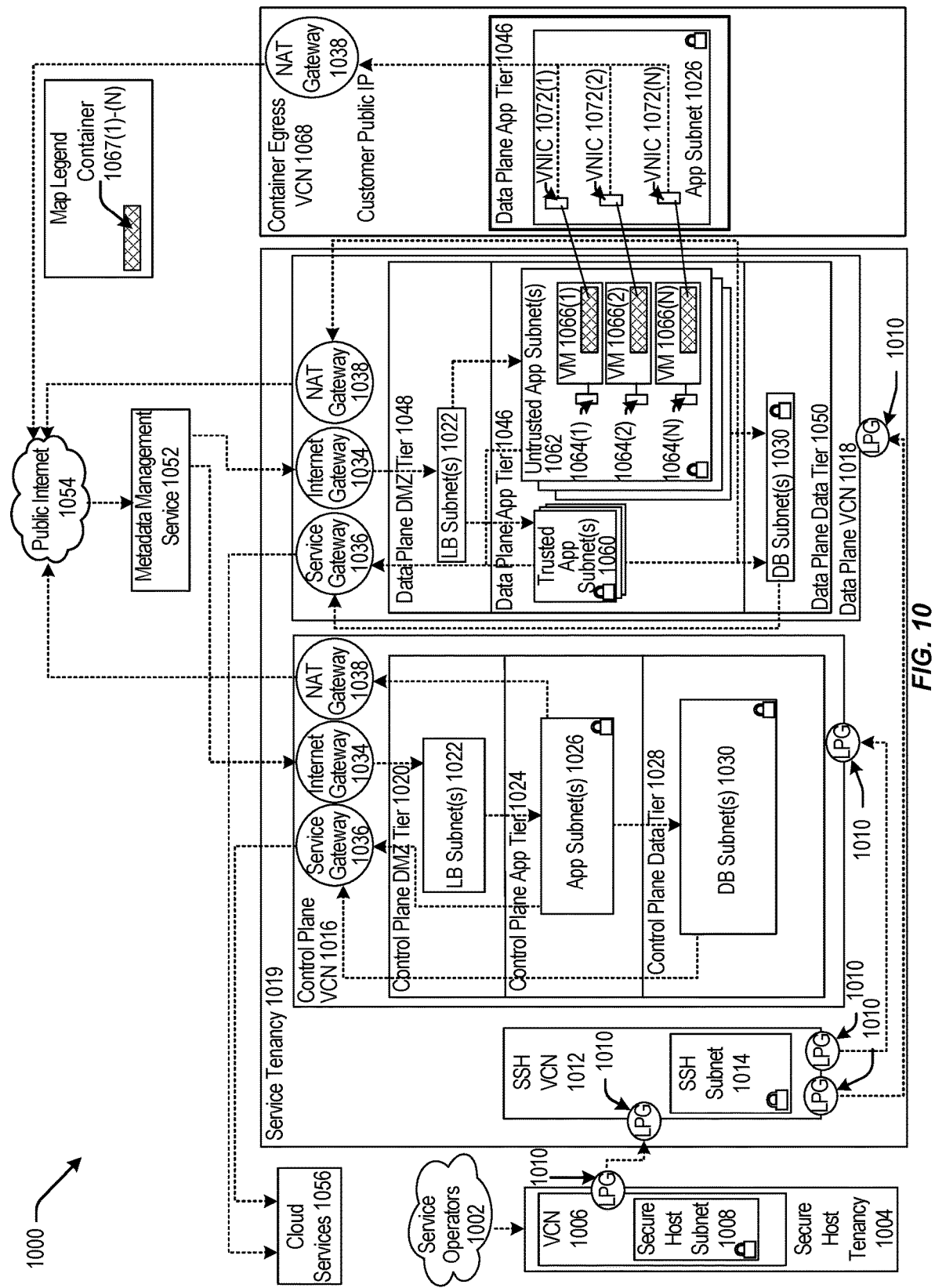
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
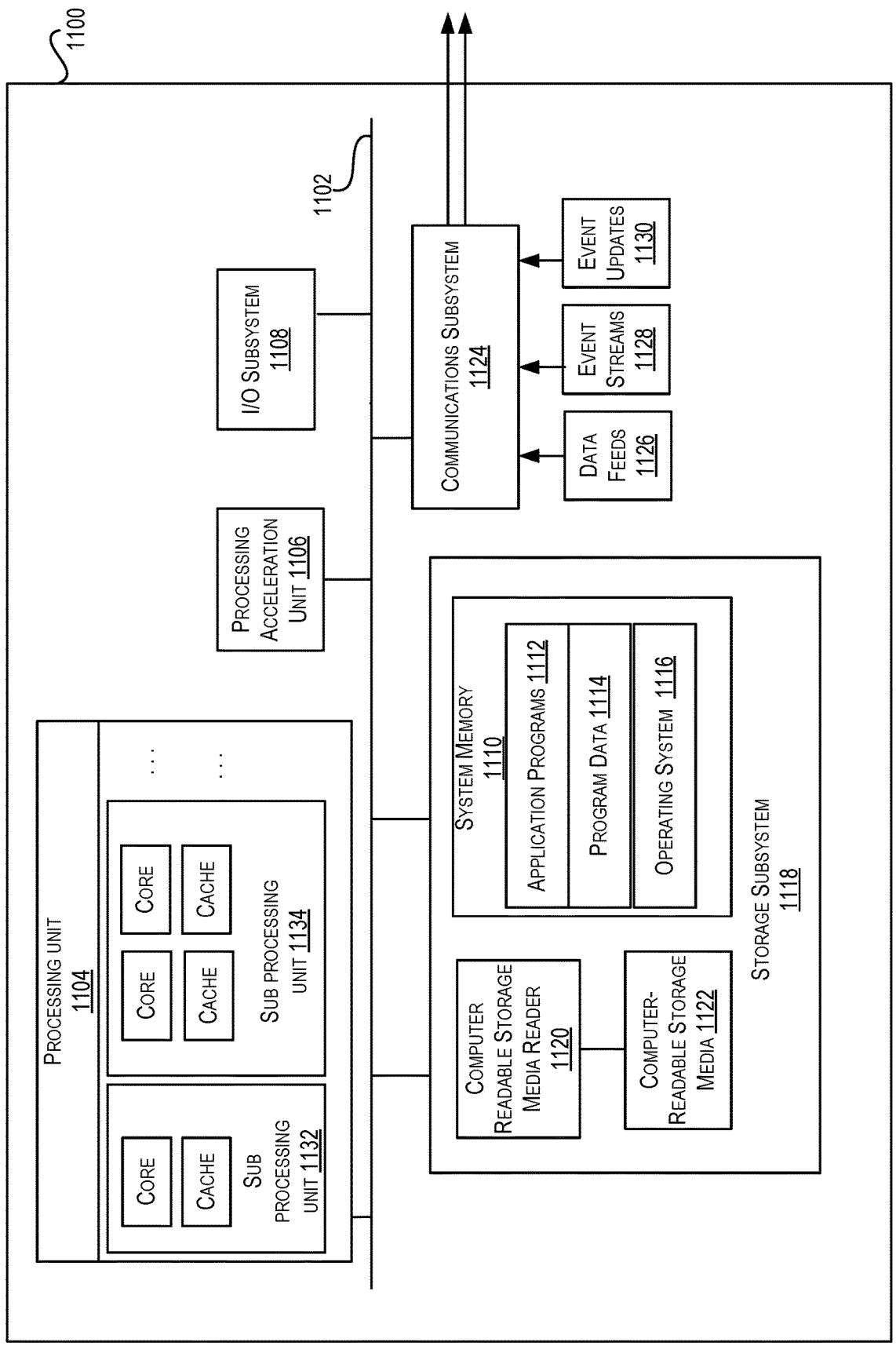
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF)

transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a computer system, a request to write data to a volume;
   identifying, by the computer system, a zone segment mapped to the volume, the zone segment comprising a plurality of zones;
   identifying, by the computer system, a segment pointer indicating a write location in the zone segment;
   writing, by the computer system, the data to one or more zones of the plurality of zones of the zone segment, starting at the write location, the one or more zones comprising at least a zone and a subsequent zone in the zone segment; and
   updating, by the computer system, the segment pointer according to a data endpoint of the data in the zone segment.

2. The method of claim 1, further comprising:
   ascertaining a size of the data identified in the request;
   ascertaining a capacity of the zone, wherein the capacity corresponds to a write path between the write location and a zone endpoint of the zone;
   comparing the capacity of the zone to the size of the data;
   in accordance with the size of the data exceeding the capacity of the zone, breaking the data into a first block and a second block, wherein a size of the first block corresponds to the capacity of the zone;
   writing the first block starting at the write location; and
   writing the second block to the subsequent zone of the zone segment.

3. The method of claim 1, wherein updating the segment pointer comprises:
   in accordance with the data endpoint of the data in the zone segment coinciding with a capacity of the zone segment, marking the zone segment as a full zone segment;
   identifying a new zone segment mapped to the volume; and
   updating the segment pointer to the starting point of the new zone segment.

4. The method of claim 1, wherein identifying the segment pointer comprises 2 scanning the zone segment mapped to the volume for empty or open zones.

5. The method of claim 4, wherein identifying the segment pointer further 2 comprises:
   in accordance with the zone segment mapped to the volume not including an empty or open zone, allocating a new zone segment to the volume, wherein the segment pointer is a start position of a first zone of the new zone segment.

6. The method of claim 1, further comprising:
   ascertaining a usage fraction of the zone segment;
   comparing the usage fraction to a usage threshold;
   in accordance with the usage fraction not satisfying the usage threshold:
      identifying stored data in the plurality of zones of the zone segment;
      mapping the stored data from one or more source zones to one or more empty or open zones of the plurality of zones;
      writing the stored data to the empty or open zones; and
      resetting the source zones to an open status.

7. The method of claim 6, wherein identifying stored data in the plurality of zones comprises:
   receiving mapping metadata describing the mapping of the zone segment to the volume; and
   locating the stored data in the plurality of zones according to the mapping metadata.

8. The method of claim 1, wherein the plurality of zones are implemented in a shingled magnetic recording storage system.

9. A system, comprising:
   a memory configured to store computer-executable instructions; and
   one or more processors configured to access the memory and execute the computer-executable instructions to at least:
      receive a request to write data to a volume;
      identify a zone segment mapped to the volume, the zone segment comprising a plurality of zones;
      identify a segment pointer indicating a write location in the zone segment;
      write the data to one or more zones of the plurality of zones of the zone segment, starting at the write location, the one or more zones comprising at least a zone and a subsequent zone in the zone segment; and
      update the segment pointer according to a data endpoint of the data in the zone segment.

10. The system of claim 9, wherein the one or more processors are further configured to execute the computer-executable instructions to further at least:
    ascertain a size of the data identified in the request;
    ascertain a capacity of the zone, wherein the capacity corresponds to a write path between the write location and a zone endpoint of the zone;
    compare the capacity of the zone to the size of the data;
    in accordance with the size of the data exceeding the capacity of the zone, break the data into a first block and a second block, wherein a size of the first block corresponds to the capacity of the zone;
    write the first block starting at the write location; and
    write the second block to the subsequent zone of the zone segment.

11. The system of claim 9, wherein updating the segment pointer comprises:

in accordance with the data endpoint of the data in the zone segment coinciding with a capacity of the zone segment, marking the zone segment as a full zone segment;

identifying a new zone segment mapped to the volume; and updating the segment pointer to the starting point of the new zone segment.

12. The system of claim 9, wherein identifying the segment pointer comprises scanning the zone segment mapped to the volume for empty or open zones.

13. The system of claim 12, wherein identifying the segment pointer further 2 comprises:

in accordance with the zone segment mapped to the volume not including an empty or open zone, allocating a new zone segment to the volume, wherein the segment pointer is a start position of a first zone of the new zone segment.

14. The system of claim 9, wherein the one or more processors are further configured to execute the computer-executable instructions to further at least:

ascertain a usage fraction of the zone segment;

compare the usage fraction to a usage threshold;

in accordance with the usage fraction not satisfying the usage threshold:

identify stored data in the plurality of zones of the zone segment;

map the stored data from one or more source zones to one or more empty or open zones of the plurality of zones; and write the stored data to the empty or open zones; and reset the source zones to an open status.

15. The system of claim 14, wherein identifying stored data in the plurality of zones comprises:

receiving mapping metadata describing the mapping of the zone segment to the volume; and locating the stored data in the plurality of zones according to the mapping metadata.

16. A non-transitory computer-readable medium storing instructions executable by a computer system that, when executed by one or more processors of the computer system, cause the one or more processors to perform operations comprising:

receiving, by a computer system, a request to write data to a volume;

identifying, by the computer system, a zone segment mapped to the volume, the zone segment comprising a plurality of zones;

identifying, by the computer system, a segment pointer indicating a write location in the zone segment;

writing, by the computer system, the data to one or more zones of the plurality of zones of the zone segment, starting at the write location, the one or more zones comprising at least a zone and a subsequent zone in the zone segment; and updating, by the computer system, the segment pointer according to a data endpoint of the data in the zone segment.

17. The non-transitory computer-readable medium of claim 16, wherein the operations further comprise:

ascertaining a size of the data identified in the request;

ascertaining a capacity of the zone, wherein the capacity corresponds to a write path between the write location and a zone endpoint of the zone;

comparing the capacity of the zone to the size of the data;

in accordance with the size of the data exceeding the capacity of the zone, breaking the data into a first block and a second block, wherein a size of the first block corresponds to the capacity of the zone;

writing the first block starting at the write location; and writing the second block to the subsequent zone of the zone segment.

18. The non-transitory computer-readable medium of claim 16, wherein updating the segment pointer comprises:

in accordance with the data endpoint of the data in the zone segment coinciding with a capacity of the zone segment, marking the zone segment as a full zone segment;

identifying a new zone segment mapped to the volume; and updating the segment pointer to the starting point of the new zone segment.

19. The non-transitory computer-readable medium of claim 16, wherein identifying the segment pointer comprises scanning the zone segment mapped to the volume for empty or open zones.

20. The non-transitory computer-readable medium of claim 19, wherein identifying the segment pointer further comprises:

in accordance with the zone segment mapped to the volume not including an empty or open zone, allocating a new zone segment to the volume, wherein the segment pointer is a start position of a first zone of the new zone segment.

* * * * *